3,322,778
NOVEL ETHER DERIVATIVES OF
BENZMORPHANS
Solomon M. Kupchan, Madison, Wis., and Alan F. Casy, London, England, assignors to Smith Kline & French Laboratories, Philadelphia, Pa., a corporation of Pennsylvania
No Drawing. Filed May 26, 1964, Ser. No. 370,332
5 Claims. (Cl. 260—294.7)

This invention relates to novel ether derivatives of benzmorphans which have unexpected analgetic properties. More specifically, the compounds of this invention are methoxymethyl ethers of known benzmorphan analgetic compounds.

The ether derivatives have a lower physical dependence capacity and toxicity than the corresponding parent hydroxy compounds. For example, the methoxymethyl ether of 2'-hydroxy-5,9-dimethyl-2-phenethyl-6,7-benzmorphan in the monkey addiction test gives no suppression of morphine abstinence at doses up to 32 mg./kg. subcutaneously whereas the parent compound, 2'-hydroxy-5,9-dimethyl-2-phenethyl-6,7-benzmorphan (phenazocine), gave complete suppression at doses of 17 mg./kg. Unexpectedly, the methoxymethyl ether derivative has much less addiction potential than the parent compound while still retaining analgetic activity equivalent to morphine.

The compounds of this invention are represented by the following general structural formula:

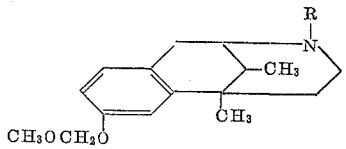

in which R represents cyclopropylmethyl or aralkyl having an alkylene chain of 2 to 4 carbon atoms and an aryl group selected from the group consisting of phenyl, thienyl, furyl, pyridyl, methylthiophenyl, nitrophenyl, methoxyphenyl, aminophenyl and dimethylaminophenyl, the phenyl compounds preferably being substituted in the ortho or para positions.

Advantageous compounds are those having R representing cyclopropylmethyl, phenethyl, p-aminophenethyl, thienylethyl, pyridylethyl or furylethyl.

A particularly advantageous and preferred compound is the methoxymethyl ether of 2'-hydroxy-5,9-dimethyl-2-phenethyl-6,7-benzmorphan.

The compounds of this invention are prepared by treating an alkali metal derivative of the parent phenolic base with a halomethyl methyl ether in a suitable, nonreactive organic solvent. The alkali metal derivative, advantageously sodium or potassium, is obtained by treating the parent phenolic base with sodium or potassium ethoxide or preferably with sodium naphthyl. The reaction is usually run at room temperature for a period of from one to four hours, worked up and the product purified by chromatography on alumina. If another reactive center is present in the parent compound, the method of preparation would be altered by procedures known to those skilled in this art in order to protect this reactive center. Treatment of the phenolic base with sodium naphthyl to form the sodio derivative is a method usually found suitable for secondary alicyclic alcohols, indicating the weak phenolic nature of the benzmorphan base.

The compounds of this invention may be used as such or in the form of their nontoxic, pharmaceutically acceptable, acid addition salts. Such salts are prepared from suitable acids, such as inorganic acids, for instance, hydrochloric, hydrobromic, sulfuric or phosphoric, or organic acids, for instance, acetic, pamoic, succinic, maleic or ethanedisulfonic. The acid addition salts are prepared by reacting the base with either one equivalent of acid or preferably an excess of acid in an organic solvent such as ether or an alcohol-ether mixture.

Also included in this invention are various isomers of the above-noted structures, such as cis-trans isomers ("normal" and "iso" series respectively) at the 5,9 positions, the 2,9 positions, or individual optical isomers which might be separated by fractional crystallization of the diasteroisomeric salts formed, for instance, with d- or l-tartaric acid or D-(+)-α-bromo-camphor sulfonic acid. The important iso series of compounds is assumed to have the 9-methyl group in the trans or distal position related either to the 5-methyl group or the 2-N-substituent, however, the absolute configuration of these compounds is not readily apparent. Advantageously the ethers are prepared by alkylating the desired isomer of the parent phenolic compounds.

The following examples are representative of the methods of preparation and isolation of the benzmorphan methoxymethyl ethers of this invention. It will be apparent that other substituents can be present on the aryl moiety. Modifications of these procedures will be obvious to those skilled in the art and these examples are not to be construed as limiting the scope of this invention.

*Example 1*

To a solution of sodium naphthyl (prepared from 0.1 g. of sodium and 0.58 g. of napthalene) in 20 ml. of 1,2-dimethoxyethane is added 1.07 g. of 2'-hydroxy-5,9-dimethyl-2-phenethyl-6,7-benzmorphan in the same solvent. Freshly distilled chloromethyl methyl ether (0.35 g.) in 1,2-dimethoxyethane is then added. After stirring for two hours, the reaction mixture is shaken with aqueous sodium bicarbonate, the aqueous phase dried and evaporated. The residue is chromatographed on alumina to give the methoxymethyl ether of 2'-hydroxy-5,9-dimethyl-2-phenethyl-6,7-benzmorphan which is converted to the succinate salt, M.P. 131–133° C.

Employing iso-2'-hydroxy-5,9-dimethyl-2-phenethyl-6,7-benzmorphan in the above reaction instead of the normal base, furnishes the methoxymethyl ether of the iso compound.

*Example 2*

A mixture of 1.2 g. of 2'-hydroxy-5,9-dimethyl-2-β-(4-nitrophenyl)-ethyl-6,7-benzmorphan and a solution of sodium naphthyl (prepared from 0.004 mole each of soduim and naphthalene) in 20 ml. of 1,2-dimethoxyethane is reacted with 0.35 g. of chloromethyl methyl ether as described in Example 1. Workup of the reaction mixture gives the methoxymethyl ether of 2'-hydroxy-5,9-dimethyl-2-β-(4-nitrophenyl)-ethyl-6,7-benzmorphan.

*Example 3*

Following the procedure of Example 1, a mixture of 1.08 g. of 2'-hydroxy-5,9-dimethyl-2-β-(α-thienyl)-ethyl-6,7-benzmorphan and 0.004 mole of sodium naphthyl in 1,2-dimethoxyethane is reacted with 0.35 g. of chloromethyl methyl ether to yield the methoxymethyl ether of 2'-hydroxy-5,9-dimethyl-2-β-(α-thienyl)-ethyl-6,7-benzmorphan.

Similarly, reaction of chloromethyl methyl ether with the sodio derivative of 1.06 g. of 2'-hydroxy-5,9-dimethyl-2-β-(2-pyridyl)-ethyl-6,7-benzmorphan or 1.03 g. of 2'-hydroxy-5,9-dimethyl-2-β-(α-furyl)-ethyl-6,7-benzmorphan gives the corresponding methoxymethyl ethers.

*Example 4*

A mixture of 2.3 g. of 2'-hydroxy-5,9-dimethyl-2-β-(2-methoxyphenyl)-ethyl-6,7-benzmorphan and 0.008 mole of sodium naphthyl in 1,2-dimethoxyethane is reacted with 0.7 g. of chloromethyl methyl ether to give the methoxymethyl ether of 2'-hydroxy-5,9-dimethyl-2-β-(2-methoxyphenyl)-ethyl-6,7-benzmorphan.

*Example 5*

A mixture of 1.26 g. of 2'-hydroxy-5,9-dimethyl-2-α-(4-methylthiophenyl)-propyl-6,7-benzmorphan (prepared by alkylating the base with 4-methylthiophenylpropyl bromide as in U.S. Patent 2,924,603) and 0.004 mole of sodium naphthyl in 1,2-dimethoxyethane is reacted with 0.35 g. of chloromethyl methyl ether to give the methoxymethyl ether.

Similarly, reaction of chloromethyl methyl ether with the sodio derivative of 1.2 g. of 2'-hydroxy-5,9-dimethyl-2 - β - (4-dimethylaminophenyl)-ethyl-6,7-benzmorphan gives the corresponding methoxymethyl ether.

*Example 6*

A mixture of 1.0 g. of the methoxymethyl ether of 2'-hydroxy-5,9-dimethyl-2-β-(4-nitrophenyl)-ethyl-6,7-benzmorphan (prepared as in Example 2) and 500 mg. of 10% palladium-on-charcoal in 150 ml. of methanol is shaken with hydrogen until the theoretical absorption is complete. The reaction mixture is filtered and the filtrate evaporated to give the methoxymethyl ether of 2'-hydroxy-5,9-dimethyl-2-β-(4-aminophenyl)-ethyl-6,7-benzmorphan.

*Example 7*

A mixture of 21 g. of 2'-hydroxy-5,9-dimethyl-6,7-benzmorphan, 9.0 g. of cyclopropylmethyl chloride, 16.0 g. of sodium bicarbonate and 350 ml. of ethanol is stirred with reflux for 19 hours. The cooled reaction mixture is filtered and the filtrate concentrated to give a residue which is extracted with boiling benzene. The extract is evaporated to give 2'-hydroxy-5,9-dimethyl-2-cyclopropylmethyl-6,7-benzmorphan.

Following the procedure of Example 1, a mixture of 1.8 g. of the above 2-cyclopropylmethylbenzmorphan and 0.008 mole of sodium naphthyl in 1,2-dimethoxyethane is reacted with 0.7 g. of chloromethyl methyl ether to yield the methoxymethyl ether of 2'-hydroxy-5,9-dimethyl-2-cyclopropylmethyl-6,7-benzmorphan.

What is claimed is:

1. A chemical compound selected from the group consisting of a free base and its nontoxic, pharmaceutically acceptable acid addition salts, said free base having the formula:

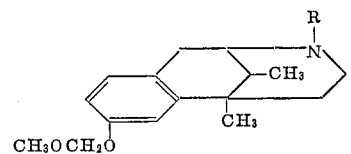

in which R is a member selected from the group consisting of cyclopropylmethyl and an aralkyl moiety, said aralkyl moiety having 2 to 4 carbon atoms in the alkyl portion and an aryl portion attached to said alkyl portion at an aryl carbon atom and selected from the group consisting of phenyl, thienyl, furyl, pyridyl, methylthiophenyl, nitrophenyl, methoxyphenyl, aminophenyl and dimethylaminophenyl.

2. O - methoxymethyl - 2'-hydroxy-5,9-dimethyl-2-phenethyl-6,7-benzmorphan.

3. Iso-O-methoxymethyl - 2' - hydroxy-5,9-dimethyl-2-phenethyl-6,7-benzmorphan.

4. O-methoxymethyl - 2' - hydroxy-5,9-dimethyl-2-β-(4-aminophenyl)-ethyl-6,7-benzmorphan.

5. O-methoxymethyl - 2' - hydroxy-5,9-dimethyl-2-cyclopropylmethyl-6,7-benzmorphan.

References Cited

Migrdichian: Organic Synthesis, vol. II, page 1283.

WALTER A. MODANCE, *Primary Examiner.*

AVROM D. SPEVACK, *Assistant Examiner.*